United States Patent [19]
Holmes et al.

[11] Patent Number: 6,119,108
[45] Date of Patent: Sep. 12, 2000

[54] SECURE ELECTRONIC PUBLISHING SYSTEM

[75] Inventors: Lyndon S. Holmes, North Andover; James King, III, Westford, both of Mass.

[73] Assignee: Aires Systems Corporation, North Andover, Mass.

[21] Appl. No.: 09/164,971

[22] Filed: Oct. 1, 1998

[51] Int. Cl.[7] .................................................. G06F 17/60
[52] U.S. Cl. ............................... 705/40; 705/18; 705/57; 705/52; 705/53; 705/58; 705/59
[58] Field of Search ................................. 705/57, 52, 53, 705/58, 59, 39, 18, 64

[56] References Cited

U.S. PATENT DOCUMENTS

| | | | |
|---|---|---|---|
| 4,688,169 | 8/1987 | Joshi | 364/200 |
| 4,796,220 | 1/1989 | Wolfe | 364/900 |
| 5,103,476 | 4/1992 | Waite et al. | 380/4 |
| 5,113,518 | 5/1992 | Durst, Jr. et al. | 395/550 |
| 5,276,869 | 1/1994 | Forrest et al. | 395/600 |
| 5,509,070 | 4/1996 | Schull | 380/4 |
| 5,509,074 | 4/1996 | Choudhury et al. | 380/23 |
| 5,553,143 | 9/1996 | Ross et al. | 380/25 |
| 5,629,770 | 5/1997 | Brassil et al. | 358/261.1 |
| 5,659,616 | 8/1997 | Sudia | 380/23 |
| 5,673,316 | 9/1997 | Auerbach et al. | 380/4 |
| 5,699,427 | 12/1997 | Chow et al. | 380/3 |

FOREIGN PATENT DOCUMENTS 844550  5/1998  European Pat. Off. .

OTHER PUBLICATIONS

Ungar Harley, News digest, pp. 1–3, Oct. 1995.
Rich Santalesa, Protecting Your(copy)Rights on the web, pp. 1–3, Dec. 1996.
Digmarc Technology, Copyright protection capability, pp. 1–2, May 1997.
Frost Tim, Optical media, pp. 1–5, Mar. 1998.
Daniel Minoli et al, Web Commerce Technology Handbook, pp. 148, 149, 160,–164, Nov. 1997.

*Primary Examiner*—James P. Trammell
*Assistant Examiner*—Munie K. Tesfamariam
*Attorney, Agent, or Firm*—Hayes, Soloway, Hennessey, Grossman & Hage, P.C.

[57] ABSTRACT

The present invention is designed to improve distribution of electronic objects by permitting publishers to enforce the copyrights associated with their objects. In accordance with the present invention, respective unique publisher identification information (e.g., including publisher identity, account number, and copyright fees for a given document, etc.) is embedded by the system into respective conventional object data files. When a user initially downloads a given electronic file and seeks to access same (e.g., via viewing and/or printing), the user is required by the system to electronically purchase (e.g., via electronic finds transfer, Cybercash™, credit card transactions, or the like) an appropriate user access license for the object, based upon the publisher identification information embedded in the object. At the time of purchase of such license, the system requires the user to supply sensitive user information (e.g., the user's name, address, telephone number, occupation, credit card number, bank account number, Cybercash™ account, etc.) in order to obtain the license, which sensitive information is embedded by the system into the electronic object, and the system encrypts the object with the embedded sensitive information, using the sensitive information as an encryption password key. Subsequently, the system will only decrypt the encrypted object if (1) the sensitive information is supplied by the user or user's computer to the system at time of requested access, or (2) another user license for that document is purchased by the user from the system at time of requested access. The system also causes any printed hardcopy of any document contained in the object, as well as any electronic copy of those documents, to include fields containing the embedded sensitive information, terms under which the user's license for the document was granted, and, if desired, legal warnings concerning copyright infringement.

46 Claims, 2 Drawing Sheets

SECURE ELECTRONIC PUBLISHING SYSTEM

BACKGROUND OF THE INVENTION

1. Field of the Invention

The present invention relates to an electronic publishing system that is able to automatically, electronically distribute copyrighted objects, provide deterrents to unauthorized use of such objects, collect copyright royalty fees for use of such objects, and track and encourage possession/redistribution of such objects, while allowing access to the contents of the redistributed objects only if appropriate copyright royalties are paid for same.

2. Description of Related Art

Methodologies and systems exist to protect software and documents (i.e., computer data that may be subject to copyright restrictions) from unauthorized distribution. For example, U.S. Pat. No. 5,509,070 issued to Schull discloses a method for encouraging the purchase of executable and non-executable software. The disclosed methods entail the generation of several user-identification codes that are forwarded to a server system (i.e., distribution system maintained by the owner of the program to be purchased) to transact a purchase of a program. In particular, central to this patent is the generation of a hardware-based target identification code that must match the code generated for the purchased program. In other words, this system relies upon the user's specific hardware environment to generate a password code. Disadvantageously, programs purchased in a particular hardware environment cannot be distributed to other users to obtain rights for same. Thus, while this system requires the purchase of a document or program before use, this system fails to account for the reality that documents and programs are quite often distributed among users, and thus, copyright owners and program owners cannot realize additional revenues through user-to-user distribution. Similarly, U.S. Pat Nos. 4,796,220 issued to Wolfe, 4,688,169 issued to Joshi and 5,113,518 issued to Durst, Jr. et al. each prevent unauthorized distribution by tying a purchased program to a particular hardware environment, and thus, these patents also suffer from the aforesaid disadvantages.

In another example, U.S. Pat. No. 5,103,476 issued to Waite et al. discloses a system and method for activating various programs at remote computer locations. This system operates by initially providing a user (i.e., remote computer) with a portion of a program, e.g., a program with key functionality pieces not provided. If that users wishes to obtain the full program, an electronic transaction is required whereby the program's owner supplies the missing pieces, and the user completes a financial transaction. The owner also encodes the program with a tamperproof overlay upon completion of the transfer, thereby preventing further distribution of the program to other users. Thus, this system, in effect, discourages distribution of programs and documents. Moreover, the reality for program distributors is that users quite often find ways around "tamperproof" distribution, and such is indeed a dilemma for software makers worldwide. Thus, this system has dubious value for software owners because users can easily circumvent the security measures installed into the software.

It is apparent the prior art systems and methodologies have failed to account for the reality of electronic object distribution because such systems and methods are premised on preventing distribution, which is exactly what program/document owners want to encourage. Moreover, prior art systems that require specific hardware to access a purchased program/document ignore the reality that users often have several computer systems, which may include several different hardware platforms, and such a user should be permitted to transport a validly purchased object to a variety of hardware platforms.

SUMMARY OF THE INVENTION

Advantageously, the present invention allows electronic publishers to electronically disseminate copyrighted objects, while maintaining exact respective formatting of the original object, and ensuring the respective copyright holders of the objects receive their copyright royalties for same. The present invention also encourages licensed users of said objects to redistribute copies of same to other potential users, but since it is unlikely that a licensed user would make available the user's sensitive user information to another user, the system also permits those potential users to access said objects only upon payment of appropriate royalty fees to the copyright holders of said objects. Additionally, the present invention makes it difficult to by-pass the present invention's unauthorized access prevention measures (e.g., via the random insertion of the hidden/invisible objects and instructions in the sealed document files, etc.), and provides means to track distribution/redistribution of objects initially distributed by the present invention via subsequent licenses purchased via the present invention.

Accordingly, the present invention provides a system to encourage distribution and purchase of an electronic object. The system includes a purchasing authority system for encoding an electronic object with executable instructions. A user can request and receive the encoded electronic object, via a user system in communication with the purchasing authority. Upon receipt and initial access of the encoded electronic object, the executable instructions automatically initiate communication between the user system and the purchasing authority system to conduct a financial transaction between the user system and the purchasing authority system, obtain a user password for access to the object in exchange for the financial transaction, and to embed the object with the user's personal information and/or payment information to permit the user to access the electronic object based upon the password and the personal information and/or payment information. In addition, subsequent copies of the password-protected object distributed by the user to subsequent users contain the initial user's personal identification and/or payment information and the executable instructions. Subsequent users are permitted to validly purchase the object via said executable instructions and, at such time of a subsequent purchase, the initial user's personal identification and/or payment information are removed from the user-distributed copy of the object by the purchasing authority system.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE INVENTION

As used herein, the terms "object" and "electronic object" should be viewed quite broadly as encompassing textual, graphical, pictorial, executable programs, software, and other forms of copyrightable works, in computer-readable/reproducible/transmittable forms. Also, although the following description will be made with specific reference to use of an Adobe Acrobat Reader™ and associated plug-in processes, other types of programs and processes may be used in the present invention, depending upon the particular configuration of the system and formats of the files used therein, and is only provided as an exemplary embodiment of the present invention.

As an overview, the system and method of the present invention operate as follows. An electronic object is encoded with an executable file by a purchasing authority system. The object, with the encoded file, is made generally available to public access, via the internet, etc. When a user attempts to open the object, the executable file interrupts access to the object, and automatically establishes a communication link between the user and the purchasing authority system to conduct a financial transaction between the user and the purchasing authority system (thereby perfecting a proper payment and/or license of the object from the owner of that object to the user) and a password is given to the user to access the object. In addition, the purchasing authority system requires the user to supply personal information (name, address, telephone, social security number, etc.) as well as payment information (credit card information, etc.), which are encoded into the object such that (as described below) the user's payment information and/or personal identification is displayed and/or printed within the object itself. Since it is unlikely that a user would desire other users to view his/her personal information, that user is hence deterred from distributing the document with that user's password. However, the document can be distributed to other users without that user's password, and when such another user attempts to access the object, the above functionality is repeated, thereby encouraging distribution, and payment therefore, of electronic objects.

Figure 1:
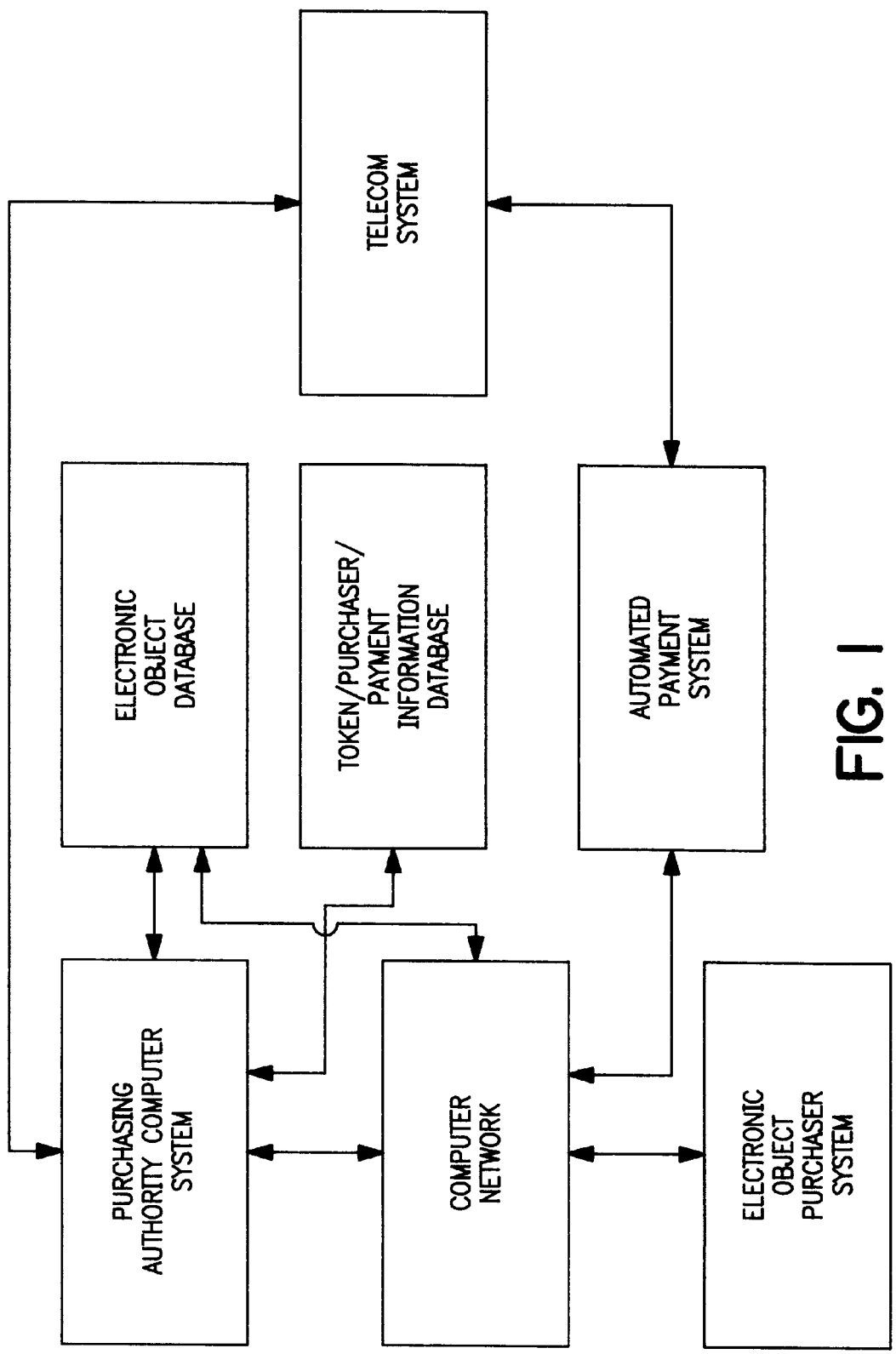
FIG. 1 is an architectural-level, functional block diagram of the system of the present invention.

FIG. 1 is an architectural-level, functional block diagram of the system of the present invention. The various functional components of the system of the present invention include a purchasing authority computer system (PACS), an electronic object database (EOD), a token/purchase payment information database (TPPID), a computer network (CN), and an electronic object purchaser system (EOPS). As used herein, the EOPS is typically a user computer system that can be operated remotely, by one or more users, in a private (i.e., individual or group) or public (e.g., library, etc.) setting. The PACS may be owned by a publisher (i.e., an entity which owns copyright(s) to object(s) disseminated by the system of the present invention), or authorized to act on behalf of the copyright holder(s) of the documents being disseminated by the system of the present invention. As will be described in greater detail below, the PACS stores to and retrieves data from each of the EOD and TPPID, and transmits data to and retrieves data from the EOPS via the CN.

Each of the PACS, EOD, TPPID, and EOPS may comprise one or more distributed computer program processes running on one or more networked personal (e.g., Apple McIntosh™ or Intel Pentium™-based) and/or mainframe computers and include such additional computer, mass storage, and communications hardware and software as is appropriate to enable performance of their stated functions. For example, the EOD and TPPID preferably each comprises Oracle™ SQL relational database management processes, and the EOPS preferably comprises an Adobe Acrobat Reader™ process with a custom-designed Adobe Acrobat Reader™ plug-in process, adapted to carryout the stated functionality for these functional components. Of course, the present invention is not intended to be limited to document data, for example, documents in Adobe Acrobat Reader™ form, but rather, the present invention is intended to be applied to any form of computer readable/transmittable data. The computers may run the Microsoft Windows™, Windows NT™, or DOS™ operating systems. Alternatively, the various functional components of the system present invention may be constructed solely out of custom, dedicated electronic hardware and software, without departing from the present invention. Further alternatively, rather than use the aforesaid types of computers, the system of the present invention may instead utilize SUN™ and/or RISC-based workstations. The CN may comprise a TCP/IP-based wide area network (e.g., an Internet-type of computer network). Of course, as will be appreciated by those skilled in the art, the present invention should not be viewed as being limited to the above-described types of computer/communications hardware, operating systems, and program processes, but rather, should be viewed expansively, as encompassing all types of computer/communications hardware, operating systems, and program processes so long as the stated functionality for the present invention may be carried out by same.

In accordance with the present invention, the PACS assigns to each object stored in the EOD a unique publisher object token ("token") representing/containing the respective unique publisher identification and object licensing information (e.g., license price, continuing period payments, limitations on use, etc.) associated with that object. These tokens are stored in the TPPID, and the PACS embeds the respective token data and certain program instruction data (whose purpose will be described below) into the respective object file, which may include an industry standard type of data format, such as Adobe Acrobat™ Personal Document Format (PDF) associated with the data in such a way as not to affect the computer reproducibility (e.g., viewable or printability) of the object whose data is contained in the data file. For example, if the data format of the object is a document file in Adobe PDF™ format, the PACS may accomplish this by embedding the program instruction and respective token data as hidden/invisible data randomly located within the document file. For example, individual sub-components (individual letters and/or word) of the program instruction and respective token data may be randomly embedded as hidden/invisible data within the document file data stream. The document data files with the embedded respective program instruction and token data (hereinafter termed "sealed object files") are then stored in the EOD.

A user of the EOPS may download a sealed object file by issuing commands for same to the PACS via the CN (e.g., via hypertext transfer protocol (HTTP), file transfer protocol (FTP), or other such commands, through a graphical user interface of the type provided by Microsoft Internet Explorer™, Netscape™, MOSAIC™ or the like. In response to such commands, the EOPS issues commands to the EOD to retrieve the sealed object requested by the user, and to transmit same to the EOPS via the CN. Once download of the sealed electronic object requested by the user is completed, the user may attempt to access (via, e.g., launching if the object is an executable file, or viewing and/or printing if the object is a data file) the objects(s) whose data are contained in the sealed object file(s). For example, if the sealed object(s) are in Adobe PDF™, the user may seek such access via appropriately loading and using the aforesaid Adobe Acrobat Reader™ and associated plug-in. The program instructions contained in the sealed document cause the plug-in to search the sealed file for hidden/invisible object(s) containing sensitive user information. If the current user access being attempted is the first one after initial download of the sealed file via the CN, such sensitive user information will not be present in the sealed file. This will cause the plug-in to only permit the aforesaid Adobe Acrobat Reader™ to permit user access to certain portions (e.g., an abstract or summary) of the document whose data is contained in the sealed file, and to prompt the user (e.g., via a graphical user interface) to purchase a user access license for the document if the user wishes complete access to the document. The specific terms of the license are generated by the plug-in based upon the token data embedded in the sealed file, and are displayed along with the license purchase prompt.

If the user agrees to purchase the license based upon these terms, the plug-in prompts the user to provide sensitive user information to permit electronic purchase of the license to be effectuated. Some examples of sensitive information, as used herein, can be of the form of credit card numbers, and/or social security numbers, and/or other personal information that a user inherently would not want distributed. The plug-in then transmits this sensitive user information to the PACS via the CN (e.g., using a secure protocol, such as SSL-https 40 bit encryption technology); the PACS then effectuates the electronic purchase by issuing appropriate commands to the conventional automated payment system (e.g., Cybercash network, electronic funds transfer, credit card, Secure Electronic Transaction™, and/or automated clearing house system) either via a conventional telecom system or via secure transaction using the CN. Once the electronic purchase is accomplished, the PACS stores in the TPPID the data associated with the purchase (e.g., for auditing and other purposes), and communicates to the plug-in via the CN that such purchase has been completed.

Figure 2:
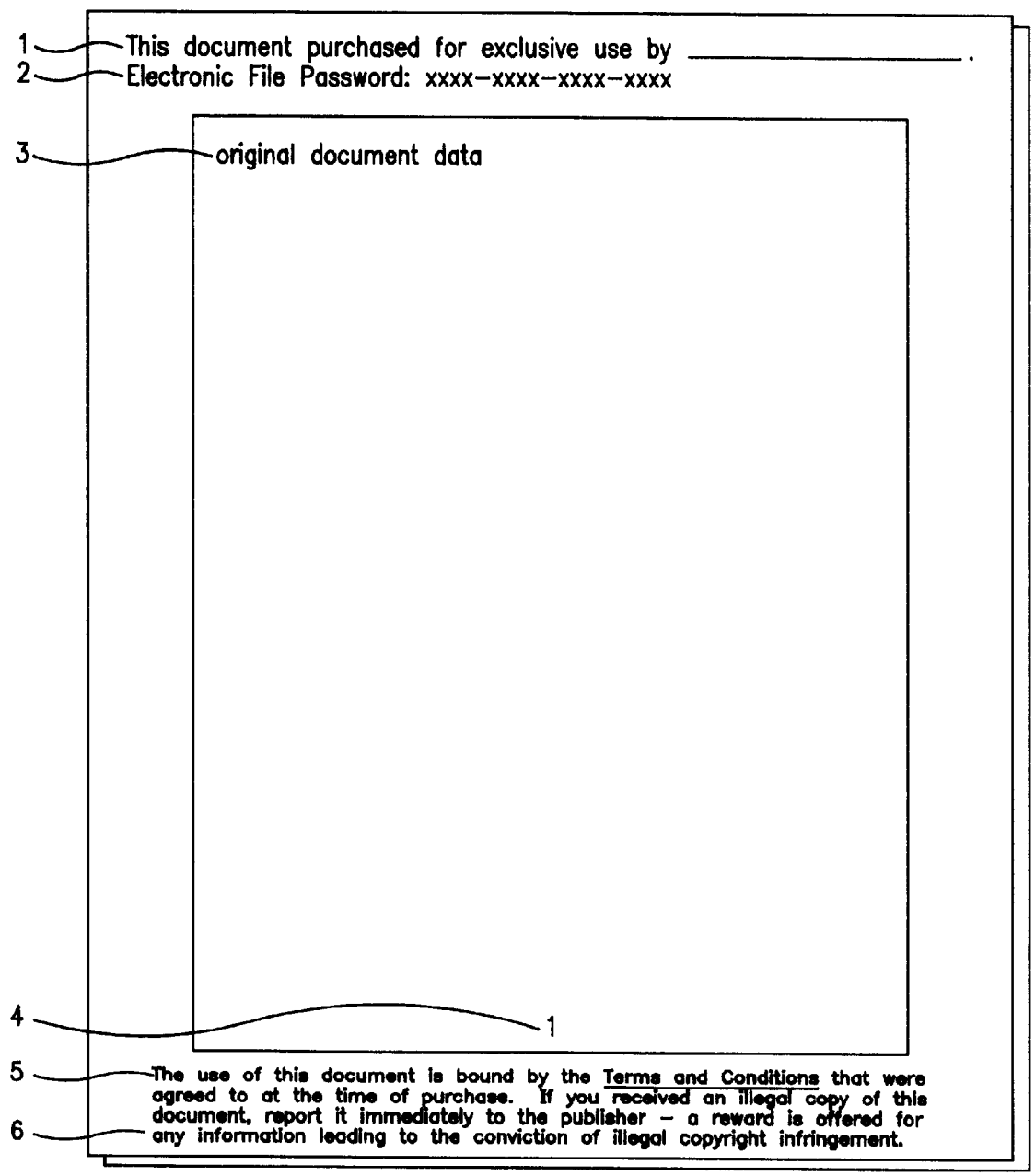
FIG. 2 is an example the document file as modified by the system of the present invention.

In response to this notification by the PACS, the plug-in modifies the sealed file so as to cause a "security message" (e.g., containing the sensitive user information, terms under which the user's license for the document was granted, and/or legal warnings concerning copyright infringement) to be displayed or printed in text fields around the document when same is viewed or printed, respectively, while maintaining the original formatting of the document. An examples of how the resulting hardcopy of such a modified sealed file may appear when printed by the EDPS is shown in FIG. 2. The plug-in may accomplish this modification by randomly inserting text objects of each letter or word of the text fields in the data stream of the sealed file. The plug-in then encrypts at least the portions of the sealed file that contain the document data using the sensitive user information as the encryption password key. This encryption may be carried out using the Adobe RC4™ PDF encryption method. The plug-in then generates a message to the user indicating that future access to portions of the document other than the aforesaid certain portions thereof (e.g., document abstract or summary) will require the user to enter the sensitive user information as a password. Access to the unencrypted document will then be permitted by the plug-in, but any viewing and printing or electronic retransmission of the document by the Adobe Acrobat Reader™ will include the aforesaid security message around the document.

Any subsequent attempts to access the portions of the document other than the aforesaid certain portions thereof will cause the plug-in to prompt the user for entry of the sensitive user information password. Correct entry of the sensitive user information password in response to the prompt will cause the plug-in to decrypt and permit user access to the entire document via the Adobe Acrobat Reader™. However, with each incorrect entry of the password, the plug-in will prompt the user (1) to purchase a user access license for the document together with the terms for said license, or (2) re-enter the correct password. Access to the entire document will only be permitted by the plug-in upon entry of the correct password for the document. Similarly, if the encrypted document file is copied and furnished for use to another user, either via the EDPS shown in FIG. 1 or via another EDPS (not shown), decryption and access to the entire document will be impossible without entry of the correct password for the document, and the other user will be prompted (according to the aforedescribed process) to enter the correct password or purchase a license from the PACS.

Alternatively, if the EDPS is not equipped with the Adobe Acrobat Reader™ plug-in, but is only equipped with the Adobe Acrobat Reader™ itself, the program instructions embedded in the sealed file being accessed may cause the EDPS to prompt the user to obtain and load (e.g., by displaying the HTTP link to an appropriate plug-in download site on the world wide web, and requesting that the user to initiate such download) said plug-in, and may not permit the user to access any of the actual document data contained in the sealed file until such download and loading of the plug-in are completed.

Of course, documents (as shown in FIG. 2) are only an exemplary form of electronic object that can be processed by the system of the present invention. As mentioned above, the system of the present invention is equally capable of providing pictorial, graphical, video, audio, and other forms of computer data, as well as complete executable files and software packages. To that end, appropriate readers and/or plug in modules can be provided with any given object to permit a user to access that object.

Modifications to the present invention will be apparent to those skilled in the art. For example, as a further security measure, the sealed documents may be encrypted by the PACS prior to transmission to the EDPS using a predetermined standard encryption key. In this modification, after initially downloading the sealed file, the plug-in may decrypt the sealed file using the predetermined key prior to undertaking further processing as discussed above. Also, alternatively, the sensitive information associated with any previous licensee of the document file may not erased by the system from that file, but rather, may be converted into invisible, non-printable/non-viewable objects within the file, and remain in this latter form in the document file, in order to permit redistribution tracking of the document, if necessary. The encryption password and security message may be based upon the last licensee of the document file.

Further modifications may also be possible. For example, rather than search the sealed file for sensitive user information, the plug-in may instead search the EDPS, and/or TPPID via the CN, for encrypted data files containing such sensitive user information, or may determine whether the initial access password for the document file has been changed by searching for an appropriate data flag in the sealed file.

Yet other modifications are also possible. For example, when selecting a sealed document file for download, the user of the EDPS may be permitted by the PACS to select level of compression and downsampling to be used to dynamically create the actual sealed document file to be downloaded from an original locked and compressed sealed document file of highest image quality stored in the EDD. The EDPS may also be adapted to decompress and unlock the document file once it has been downloaded.

Additionally, means (not shown) may exist in the system of the present invention for permitting automatic download and/or other access to the data stored in the EDD and TPPID, and/or control of the PACS by other computer systems and/or networks (e.g., a publisher or publisher proxy service server). Also, further alternatively, initial download of the sealed document may be accomplished using a physical storage medium (e.g., floppy or optical disk) containing same rather than via the CN.

Yet other modifications are also possible. For example, the system of the present invention may be adapted to permit multiple sealed documents to be grouped together for licensing under bundled license arrangements wherein a single sensitive user information password may be used as the encryption key for multiple documents downloaded and licensed at one time.

Yet other modifications are possible. For example, the system of the present invention may be adapted to provide the encoded object with additional authentication markers and processes for determining authenticity. For example, the object can be provided to the user with a checksum instruction which determines an initial checksum value for the object (or some segment thereof), and upon any subsequent access by a user, the checksum operation is repeated. If a valid checksum value is present in any given instance of the accessed object, a visual indication can be provided to the user that the purchased object is indeed authentic. Of course, any subsequent users who obtain the object and who purchase access rights to that document (as described above) are likewise notified of the object's authenticity.

In still other modifications, the system of the present invention may be appropriately adapted with a user registry (not shown) that contains individual purchase and object information for each user thereof. In one implementation, a database could be established by the PACS which is appropriately adapted to maintain an updatable account of each user, each object purchased by a given user, and other information (e.g., user purchasing method, licenses granted, etc.), thereby permitting a given user to reacquire a purchased object (in the event of loss, destruction, etc.) without having to repurchase that object. In addition, the system of the present invention can be appropriately modified to trace distribution of a given object from user to user, thereby permitting copyright owners to maintain records of the identity of individuals who have purchased their objects.

What is claimed is:

1. A system for controlling distribution and purchase of an electronic object, comprising a purchasing authority system for encoding an electronic object with executable instructions; and a user system in electronic communication with said purchasing authority system for requesting and receiving said encoded electronic object; wherein, upon receipt and initial access of said encoded electronic object, said executable instructions automatically initiating electronic communication between said user system and said purchasing authority system to conduct a financial transaction between said user system and said purchasing authority system, obtain a user password for access to said object in exchange for said financial transaction, and to embed said object with said user's personal information and/or payment information to permit said user to access said electronic object based upon said password and said personal information and/or payment information; wherein said user's personal information and/or payment information being embedded in said object to prevent removal of said user's personal information and/or payment information.

2. A system as claimed in claim 1, wherein subsequent copies of said password protected object distributed by said user to subsequent users contain said user's personal identification and/or payment information and said executable instructions and wherein subsequent users being permitted to validly purchase said object via said executable instructions and wherein, at such time of a subsequent purchase, said user's personal identification and/or payment information being removed from said copy of said object by said purchasing authority system.

3. A system as claimed in claim 1, wherein said executable instructions include a plug-in module for viewing/printing/editing said object.

4. A system as claimed in claim 1, wherein said purchasing authority system further comprises an automated payment system to facilitate said financial transaction.

5. A system as claimed in claim 4, wherein said automated payment system includes electronic funds transfer, Cybercash™, and credit card transactions.

6. A system as claimed in claim 1, further comprising an electronic object database in electronic communication with said purchasing authority system and said user for storing said electronic object.

7. A system as claimed in claim 1, wherein said electronic object includes a copyrightable work.

8. A system as claimed in claim 7, wherein said copyrightable work includes textual, graphical, pictoral, executable programs, software, and other forms of digital data in computer-readable/reproducible/transmittable forms.

9. A system as claimed in claim 1, further comprising a payment information database to maintain records of individual objects purchased by said user.

10. A system as claimed in claim 1, wherein said communication between said user and said purchasing authority system includes network communication.

11. A system as claimed in claim 1, wherein said purchasing authority system being authorized to act on behalf of an owner of said electronic object.

12. A system as claimed in claim 3, wherein said plug-in module comprises Adobe Acrobat™ module and related processes for viewing/printing/editing said object.

13. A system as claimed in claim 1, wherein said financial transaction further includes a license grant to said user for obtaining rights to said electronic object.

14. A system as claimed in claim 1, wherein said executable instructions prevent said user from accessing said object unless said financial transaction is completed, said password is obtained and said object is embedded with said user's personal information and/or payment information.

15. A system as claimed in claim 1, wherein said embedding being effectuated by randomly incorporating said user's personal information and/or payment information within said object such that any attempt to remove said user's personal information and/or payment information by said user renders said object inaccessible by said user.

16. A system as claimed in claim 1, wherein said user system comprises one or more remote computer systems for use by one or more users.

17. A system as claimed in claim 1, wherein said purchasing authority system also being for encoding said object with authenticity markers to permit user-verification of the validity of said object.

18. A system as claimed in claim 1, wherein said purchasing authority system also being for encoding said object with legal and/or copyright notices related to said object such that said notices being displayed/printed upon each access of said object.

19. A system as claimed in claim 17, wherein said authenticity markers comprise a checksum operation performed on said object wherein a valid checksum result yields a verification message to said user indicating authenticity of said object.

20. A system for controlling distribution and purchase of an Adobe Acrobat™ document, comprising a purchasing authority system for encoding an Adobe Acrobat™ document with executable instructions; and a user system in electronic communication with said purchasing authority system for requesting and receiving said encoded Adobe Acrobat™ document; wherein, upon initial access of said encoded Adobe Acrobat™ document, said executable instructions automatically initiating electronic communication between said user system and said purchasing authority system to conduct a financial transaction between said user and said purchasing authority system, grant said user a password to access to said document in exchange for said financial transaction, and to embed said document with said user's personal information and/or payment information, wherein subsequent access of said document being permitted by said password; and wherein said user's personal information and/or payment information being embedded in a random format to prevent removal of said user's personal information and/or payment information from said document.

21. A system as claimed in claim 20, wherein subsequent copies of said password protected document distributed by said user to subsequent users contain said initial user's personal identification and/or payment information and said executable instructions and wherein subsequent users being permitted to validly purchase said subject via said executable instructions and wherein, at such time of a subsequent purchase, said initial user's personal identification and/or payment information being removed from said copy of said document by said purchasing authority system.

22. A system as claimed in claim 20, wherein said executable instructions include a plug-in module for viewing/printing/editing said object.

23. A system as claimed in claim 20, wherein said purchasing authority system further comprises an automated payment system to facilitate said financial transaction.

24. A system as claimed in claim 23, wherein said automated payment system includes electronic funds transfer, Cybercash™, and credit card transactions.

25. A system as claimed in claim 20, further comprising an electronic document database in communication with said purchasing authority system and said user for storing said electronic object and transmitting said document to said user upon request.

26. A system as claimed in claim 20, wherein said Adobe Acrobat™ document a PDF format document.

27. A system as claimed in claim 20, further comprising a payment information database to maintain records of individual documents purchased by said user.

28. A system as claimed in claim 20, wherein said communication between said user and said purchasing authority system includes network communication.

29. A system as claimed in claim 20, wherein said purchasing authority system being authorized to act on behalf of an owner of said Adobe Acrobat™ document.

30. A system as claimed in claim 22, wherein said plug-in module comprises Adobe Acrobat™ module and related processes for viewing/printing/editing said object.

31. A system as claimed in claim 20, wherein said financial transaction further includes a license grant to said user for obtaining rights to said document.

32. A system as claimed in claim 20, wherein said executable instructions prevent said user from accessing said document unless said financial transaction is completed, said password is obtained and said document is embedded with said user's personal information and/or payment information.

33. A system as claimed in claim 20, wherein said embedding being effectuated by randomly incorporating said user's personal information and/or payment information within said object such that any attempt to remove said user's personal information and/or payment information by said user renders said object inaccessible by said user.

34. A system as claimed in claim 20, wherein said user system comprises one or more remote computer systems for use by one or more users.

35. A system as claimed in claim 20, wherein said purchasing authority system also being for encoding said document with authenticity markers to permit user-verification of the validity of said document.

36. A system as claimed in claim 20, wherein said purchasing authority system also being for encoding said document with legal and/or copyright notices such that said notices being displayed/printed upon each access of said document.

37. A system as claimed in claim 35, wherein said authenticity markers comprise checksum instruction data to be performed on said document wherein a valid checksum result yields a verification message to said user indicating authenticity of said document.

38. A method for controlling distribution and payment of an electronic object, said method comprising the steps of:
  encoding an electronic object with an executable file;
  permitting users to obtain said encoded object;
  automatically establishing an electronic communication link between the user and a purchasing authority system upon initial access of said encoded object;
  conducting a financial transaction between the user and the purchasing authority system to obtain a user password for access to the object in exchange for the financial transaction;
  embedding the object with said user's personal information and/or payment information to permit said user to access said electronic object based upon said password and said personal information and/or payment information; and
  establishing a database to maintain a record of each user associated with said object.

39. A method as claimed in claim 38, further comprising the steps of permitting subsequent copies of said password-protected object to be distributed by said user to subsequent users, wherein any subsequent copy contains said initial user's personal identification and/or payment information and said executable instructions, and permitting subsequent users to validly purchase said object via said executable instructions; and wherein, at such time of a subsequent purchase, the initial user's personal identification and/or payment information being removed from said copy of said object by said purchasing authority system and being replaced with said subsequent user's personal identification and/or payment information.

40. A method as claimed in claim 39, further comprising the step of granting an object license to said user in exchange for said financial transaction.

41. A method as claimed in claim 39, further comprising the step of encoding said object with authenticity instructions to permit user-verification of the validity of said object, wherein said authenticity instructions comprise checksum instruction data to be performed on said document wherein a valid checksum result yields a verification message to said user indicating authenticity of said document.

42. A method as claimed in claim 39, further comprising the step of encoding said object with legal and/or copyright notices such that said notices being displayed/printed upon each access of said object.

43. A method as claimed in claim 39, further comprising the step of encoding said object with plug-in module for viewing/printing/editing said object.

44. A method as claimed in claim 39, further comprising the step of encrypting said object so that said user receives said object in an encrypted form and providing said user with an appropriate decryption instruction to decrypt said object upon receipt.

45. A system as claimed in claim 1, wherein said purchasing authority system being for encrypting said encoded object and provided a decryption instruction to said user to permit said user to decrypt said object.

46. A system as claimed in claim 20, wherein said purchasing authority system being for encrypting said encoded document and provided a decryption instruction to said user to permit said user to decrypt said document.

* * * * *

UNITED STATES PATENT AND TRADEMARK OFFICE
CERTIFICATE OF CORRECTION

PATENT NO : 6,119,108
DATED : SEPTEMBER 12, 2000
INVENTOR(S) : HOLMES ET AL

It is certified that error appears in the above-identified patent and that said Letters Patent is hereby corrected as shown below:

Face page, Item 73, "Aires" should be --Aries--

Signed and Sealed this

Twenty-ninth Day of May, 2001

*Attest:*

NICHOLAS P. GODICI

*Attesting Officer*  *Acting Director of the United States Patent and Trademark Office*